May 19, 1964   F. R. GESSNER   3,133,410
BURNING RATE CONTROL OF SOLID PROPELLANTS
Filed Aug. 15, 1960   2 Sheets-Sheet 1

INVENTOR.
F. R. GESSNER
BY Hudson and Young
ATTORNEYS

May 19, 1964  F. R. GESSNER  3,133,410
BURNING RATE CONTROL OF SOLID PROPELLANTS
Filed Aug. 15, 1960  2 Sheets-Sheet 2
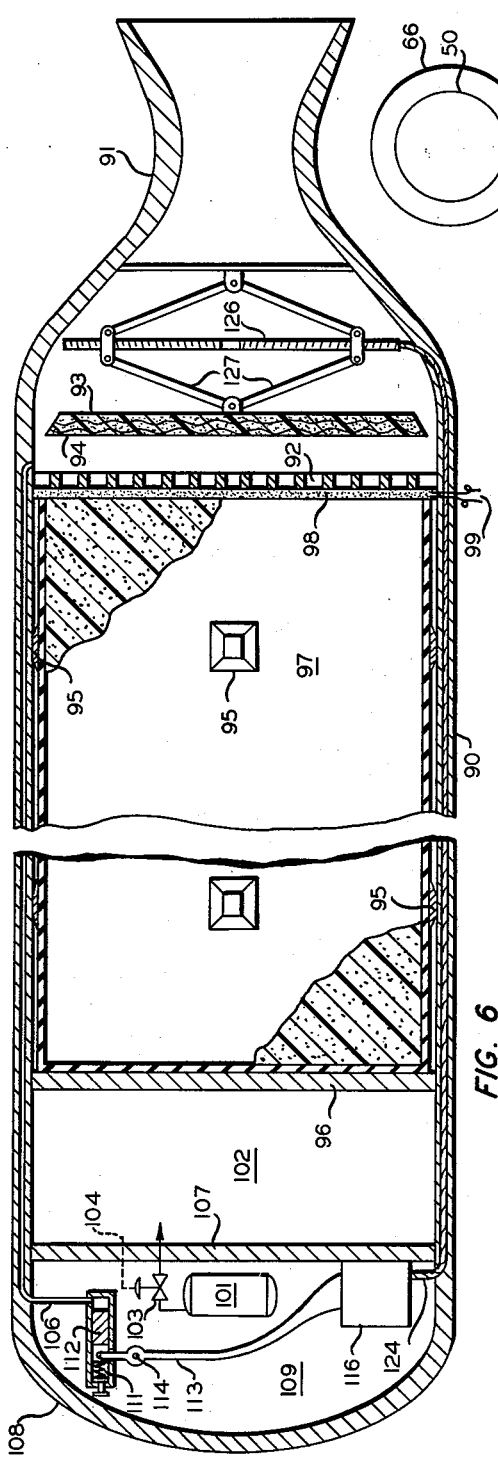
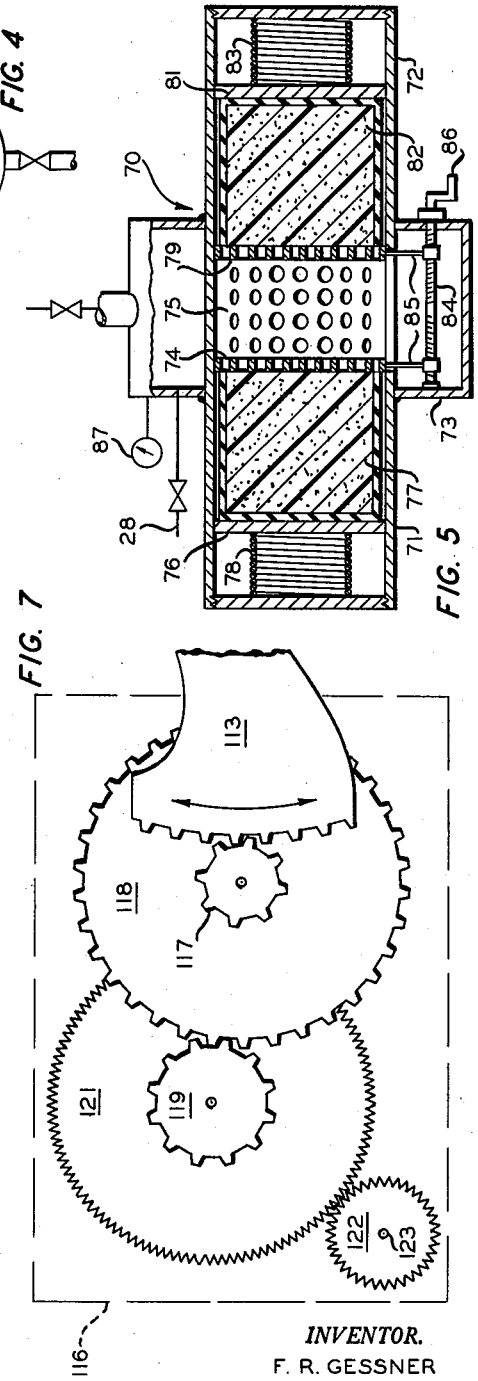
INVENTOR.
F. R. GESSNER
BY Hudson and Young
ATTORNEYS

3,133,410
BURNING RATE CONTROL OF SOLID PROPELLANTS
Frank R. Gessner, Waco, Tex., assignor to Phillips Petroleum Company, a corporation of Delaware
Filed Aug. 15, 1960, Ser. No. 49,792
19 Claims. (Cl. 60—35.6)

This invention relates to controlling the burning rate of solid propellants. In one aspect, this invention relates to a method for controlling the burning rate of solid propellants. In another aspect, this invention relates to an apparatus for controlling the burning rate of solid propellants.

Gas generator devices using solid propellants, which when burned, generate large volumes of gas at high pressures can be used for actuating prime movers, starting devices, for propulsion purposes, etc. One type of such a device has been widely used for propelling rockets and other devices. At the present time, motors using a solid propellant as a source of power are being widely used as jet assist take-off units ("JATO" units) during take-offs for heavily-loaded aircraft.

In some types of gas generators or rocket motors it is advantageous to have two or more stages of gas generation or thrust wherein the amount of gas generated or thrust developed is varied. In gas generators employed to develop large volumes of gas for driving rotating machinery, such as turbines and pumps, it is desirable to bring said machinery up to operating speed within a specified time, usually a relatively short time. Thus, two stages of gas generation or thrust can be advantageously employed; a first stage to provide a large volume of gas initially so as to overcome the inertia of the machine, and a second stage to maintain generation of gas or thrust for the desired duration of machine operation. If it is desired to vary the speed of the machine during said period of operation, still another stage or phase of gas generation, such as slowing down the volume of gases generated, would be desirable. Similarly, in some rocket motors it is advantageous to employ two or more stages of thrust; the first stage or boost phase being a high thrust phase to boost the missile or rocket rapidly to its flight velocity, and the second stage or sustained phase being of lower thrust to sustain the missile or rocket in flight to its destination.

Four principal systems are known for producing a more or less rigid two stage thrust or gas generation program. These systems are: (1) single propellant systems wherein the burning area (or thrust) are established by the geometry of the grain and the propellant burning rate, (2) two propellant systems wherein gas generation or thrust variation is obtained by using two propellants of different burning rates, (3) separate motors whereby one motor giving the boost phase and the other motor giving the sustained thrust phase are employed, and (4) variable area exhaust nozzles used alone or in combination with single or two propellant systems.

Each of said systems has limitations and disadvantages. None provides a truly efficient control method for controlling the volume of gases generated in accordance with the conditions in the gas generator itself and/or the volume of gas needed for the job at hand. Thus, all of said systems are more or less deficient with respect to flexibility of operation to meet varied operating conditions.

For example, in the system designated (1) above, the program is fixed by the predetermined geometry of the grain and the burning rate of the propellant and cannot be varied once the burning has been started. In the system designated (2) above, the program is fixed by the predetermined burning rates of the two propellants used and cannot be varied once placed in operation. In the system designated (3) above, the program is fixed by the design of the motors and the propellants used therein. In the system designated (4) above, considerable mechanical complexity is involved and the system is still limited by the predetermined burning rate of the propellant. It would be desirable to have a system wherein the volume of gas generated or thrust produced per unit of time can be controlled by varying the burning rate of a single propellant charge, or a propellant charge of single composition and simple geometric configuration, such as an end burning grain or a plurality of end burning grains. The present invention provides such a system.

I have now found that the above difficulties can be eliminated or substantially mitigated by controlling the burning rate of a propellant charge in a gas generator or rocket motor by a method which comprises varying the distance between the burning surface of said propellant and an adjacent heat radiating surface. Thus, broadly speaking, the present invention resides in a method and apparatus for controlling the burning rate of a propellant by varying the distance between the burning surface of said propellant and an adjacent heat radiating surface.

An object of this invention is to provide a method for controlling the burning rate of a solid propellant. Another object of this invention is to provide apparatus for controlling the burning rate of a solid propellant. Another object of this invention is to provide a system of gas generation by the combustion of a solid propellant wherein the amount of gas generated per unit of time can be controlled by varying the burning rate of said propellant. Still another object of this invention is to provide a method and apparatus for varying the burning rate of a solid propellant being burned in a gas generator by controlling the burning rate of said propellant in accordance with the pressure in the combustion chamber of said gas generator. Other aspects, objects, and advantages of the invention will be apparent to those skilled in the art in view of this disclosure.

Thus, according to the invention there is provided a method for controlling the burning rate of a propellant material, which method comprises: igniting said propellant; confining the resulting flame zone between the burning surface of said propellant and an adjacent spaced apart substantially non-heat conducting, heat radiating surface; and varying the distance between said burning surface and said heat radiating surface. In a presently preferred embodiment of the invention the distance between said burning surface of said propellant and said heat radiating surface is controlled in accordance with the pressure in the combustion chamber wherein said propellant is being burned.

Further according to the invention, there is provided an apparatus for controlling the burning rate of a solid propellant, particularly an apparatus wherein said burning rate can be controlled in accordance with the pressure in the combustion chamber wherein said propellant is being burned.

In one embodiment of the invention, said "substantially non-heat conducting heat radiating surface" is provided by a "substantially non-heat conducting" material which can be a refractory material such as the various ceramic or ceramic-like refractory materials described further hereinafter, or a laminated material made from resins and materials such as fiberglass as described further hereinafter. Propellant materials in themselves are "substantially non-heat conducting materials." Thus, in another embodiment of the invention, the heat radiating surface is the burning surface of an opposing grain of propellant material.

The present invention makes use of the three principal methods of heat transfer, i.e., conduction, convection, and radiation, in varying degrees. While the invention is not to be limited by any theories of operation, it is presently believed that all three methods of heat transfer are involved in controlling the effective linear burning rate of a propellant in accordance with the invention. One of the most important limiting variables affecting the burning rate of a propellant is the temperature gradient at the propellant burning surface. This is a property of the propellant and depends upon the ability of the propellant to conduct heat. When more heat is introduced at the propellant's surface than can be dissipated across said temperature gradient, intumescence or local internal explosions occur which open up new burning surface and thereby make possible greater mass burning rates; and over all, will give an apparent increase in the effective linear burning rate. If intumescence is taking place, the particles emitted will conduct their heat and transfer a considerable portion of it to an opposing burning surface or absorbing surface. This carrying of heat by intumesced particles provides the conducting aspect of the heat transfer which it is believed occurs in the practice of the invention.

Photographs have shown that great turbulence exists in the gases at or near the propellant burning surface. If these turbulent gases are permitted to contact a greater surface, then a proportionately large amount of their heat content will be transferred. This represents the convention aspect of the heat transfer which it is believed occurs in the practice of the invention.

An opposing surface "sees" the radiation from the surface in apposition to it. If said opposing surface is a good absorber, most of this radiant heat will be absorbed near its surface. Good absorbers are also good radiators. When the surface opposed to the burning surface of a first propellant is the burning surface of a second grain of propellant, the heat transferred to said opposing second propellant enhances the intumescence effect in said second opposing propellant and heat is transferred from said second opposing propellant to said first propellant. When the surface opposed to the burning surface of a propellant is a material other than a propellant material, the heat transferred thereto is radiated back to said burning surface and promotes further intumescence of said burning propellant. It is important that the surface placed in opposition to the propellant burning surface be a substantially non-heat conducting material because the effect of a material having a high heat conductivity, such as a metal, would be to remove heat from the combustion zone and thus the burning rate of the propellant would not be enhanced.

FIGURE 4 is an end view in elevation of the apparatus of FIGURE 3.

FIGURE 5 is a diagrammatic illustration, partly in cross section, of still another apparatus which can be employed in carrying out the method of the invention.

FIGURE 6 is a diagrammatic illustration, partly in cross section, of a rocket motor wherein the method of the invention can be carried out.

FIGURE 7 is a detailed illustration of a portion of the apparatus of FIGURE 6.

Figure 1:
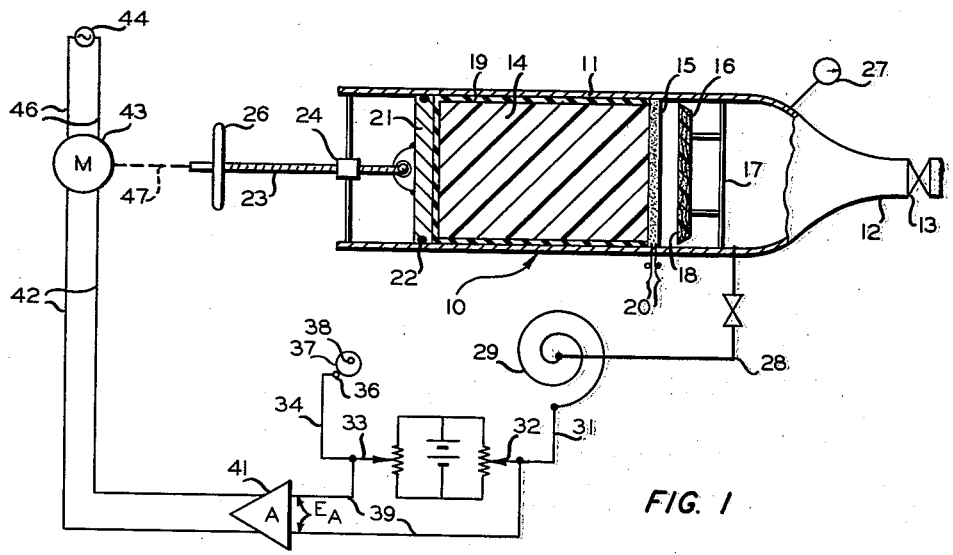
FIGURE 1 is a diagrammatic illustration, partly in cross section, of one form of apparatus which can be employed to carry out the method of the invention.

Referring now to the drawings the invention will be more fully explained. In FIGURE 1 there is shown a gas generator designated generally by the reference numeral 10. Said gas generator comprises a combustion chamber 11 having an axially disposed exhaust outlet 12 with valve 13 disposed therein. Said valve 13 can be employed to control the volume of gases delivered per unit of time from said gas generator. A grain of solid propellant material 14, adapted for burning on one end only, is slidably disposed within said combustion chamber 11. A disc of igniter material 15 is provided at said end of said propellant material. Said igniter material can be any suitable igniter material known to those skilled in the art. Lead wires 20, connected to a source of current not shown, extend through the wall of combustion chamber 11 and are embedded in said igniter material for igniting same. A member 16 of substantially non-heat conducting material is fixed by means of support bars 17 within said combustion chamber adjacent to said gas outlet. A heat radiating surface 18 of said member 16 faces toward said one end of propellant 14. It will be noted that said propellant 14 is restricted on all sides except said one end with a slow burning restricting material 19 which impedes burning of said propellant, except on said one end. A piston member 21 is slidably disposed in said combustion chamber and the other non-burning end of said propellant is bonded to one side of said piston member by means of any suitable adhesive. O-rings 22 are provided for maintaining a seal between said piston member and the wall of said combustion chamber. A jack comprising a screw rod 23 is pivotally attached to the other side of said piston member away from said propellant material. Said screw rod 23 is supported and operates in threaded collar 24 which in turn is supported by means of the support rods shown. Hand wheel 26, secured to said screw rod 23, is provided for hand operation of said screw rod 23 if desired, as described further hereinafter.

Pressure gauge 27 is provided for measuring the pressure within said combustion chamber 11. Conduit 28 provides a pressure communication between said combustion chamber 11 and Bourdon tube 29 which is connected by means of mechanical link 31 to slide resistor 32. Said slide resistor 32 is one of a pair of parallel variable slide resistors, the other being slide resistor 33, which have a common battery across the terminals thereof. Slide resistor 33 is connected by means of mechanical link 34 to cam follower 36 which follows the rotation of cam 37 mounted on a spring loaded shaft 38. In operation, said spring is wound to establish the duration of the program. Said cam 37 is shown here as an essentially round disc supported by shaft 38. However, it will be understood by those skilled in the art, particularly in view of the following disclosure, that said cam 37 can be of any desired shape to give the desired program in the operation of the equipment to which this control apparatus is applied. Lead wires 39 are connected to said slide resistors 32 and 33 for conducting the voltage generated thereby to amplifier and phase shifter 41. Current from said amplifier and phase shifter 41 is passed by means of wires 42 to one coil of split phase A.C. motor 43. The other coil of said motor is supplied with current from a current source 44 by means of lead wires 46. If desired, the shaft of said motor 43 can be connected to said screw jack 23 by means of any suitable flexible or other type connection represented here by dotted line 47.

Figure 2:
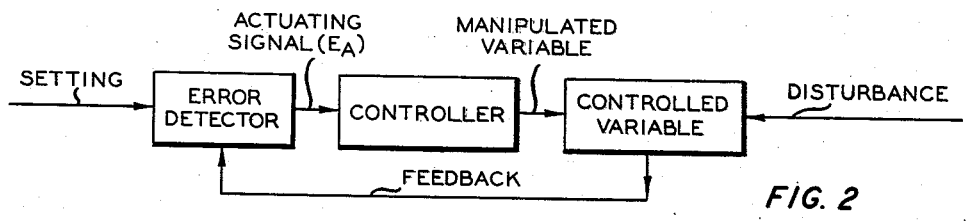
FIGURE 2 is a diagrammatic illustration of a control system which can be employed in the practice of the invention.

As indicated, the apparatus of FIGURE 1 can be operated automatically responsive to the pressure in combustion chamber 11 to give any desired program of gas generation. Many control systems are available from the prior art for performing this automatic control. One of the most widely used such systems is the so called closed loop type. FIGURE 2 illustrates diagrammatically such a closed loop system. Said system comprises an error detector into which there is fed a setting in accordance with the desired program. Said error detector puts out an actuating signal which is transmitted to a controller. Said controller, by acting upon the manipulated variable, effects a change, if necessary, in the controlled variable so as to maintain the desired program. Any disturbance causing a change in said controlled variable is fed back to said error detector and the cycle is repeated to again restore the controlled variable to the desired value.

Referring again to FIGURE 1, in the automatic operation of the device of FIGURE 1 pressure from combustion chamber 11 is transmitted via conduit 28 to Bourdon tube 29 which in turn actuates mechanical linkage 31 and causes the setting to change in slide resistor 32 if said transmitted pressure is different from the desired pressure as determined by cam programmer 37 which controls the setting of slide resistor 33. When the settings of said slide resistors 32 and 33 "coincide," no voltage is generated by the two slide resistors and consequently no actuating signal is generated. If, however, the controlled variable, which in this case is the combustion chamber pressure, differs from the program pressure, the position of slider 32 will be changed and a difference in voltage between slider 32 and slider 33 will exist which is proportional to the difference between said combustion chamber pressure and said program pressure. The resulting signal generated will be positive or negative depending upon whether the combustion chamber pressure is high or low with respect to the programmed pressure. The signal generated is weak direct current and is amplified and converted in amplifier and phase shifter 41 to 400 c.p.s. A.C. and shifted in phase by an angle which is proportional to the magnitude and the polarity of said signal. The degree and direction of phase shift controls the rotation and direction of rotation of the shaft of motor 43. Said shaft is mechanically connected to screw rod 23. Thus, the position of the jack, which varies the distance between the burning surface of the propellant 14 and radiating surface 18, represents the manipulated variable and the controlled variable is the combustion chamber pressure. When the distance between the burning surface of said propellant and said radiating surface 18 is decreased, the burning rate is increased with consequent increase in volume of combustion gases which causes a change in combustion chamber pressure, and conversely.

If it is not desired to employ the above described automatic control apparatus, the operator can observe the pressure reading on pressure gage 27 and can vary the distance between the burning surface of propellant 14 and heat radiating surface 18 by employing hand wheel 26 to turn screw rod 23 in bushing 24. Said distance can thus be varied to vary the propellant burning rate and control the pressure in combustion chamber 11, for a given setting of valve 13.

Figure 3:
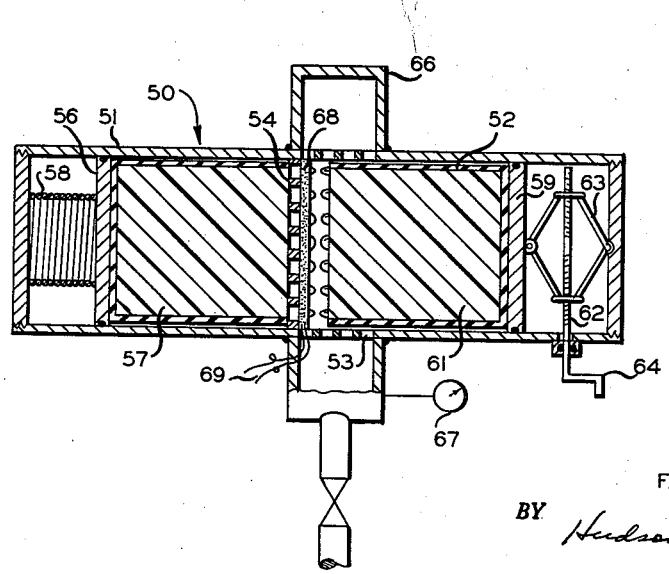
FIGURE 3 is a diagrammatic illustration, partly in cross section, of another apparatus which can be employed to carry out the method of the invention.

Obviously the gas generator of FIGURE 1 could be modified to provide means for biasing propellant 14 against a fixed grate, such as grate 54 in FIGURE 3, and means provided to move member 16 similarly as in FIGURE 3 or in FIGURE 6.

The gas generator illustrated in FIGURE 3 comprises a combustion chamber designated generally by the reference numeral 50 and having a first end section 51 and a second end section 52. One end of each of said end sections is normally closed as shown. The other end of each of said sections is normally open as shown and said end sections are connected at said open ends thereof by means of a perforated mid-section 53 which forms a gas outlet for said combustion chamber. A perforated grate 54 is fixed across said first end section at its open end and adjacent said mid-section gas outlet. A first piston member 56 is slidably disposed in said first end section on the other side of said grate from said gas outlet. A first grain of propellant material 57, restricted on all surfaces except one end with a slow burning restrictor material, and thus adapted for burning on said one end only is disposed in said first end section 51 between said grate 54 and said piston member 56. A spring 58, or any other suitable means, is disposed in said first end section between its closed end thereof and said piston member 56 for moving said piston member so as to bias said first grain of propellant material 57 against said grate 54 continuously until said propellant material is consumed.

A second piston member 59 is slidably disposed in said second end section 52. A second grain of propellant material 61, also adapted for burning on one end only, is bonded at its other end to one side of said second piston member 59 and is disposed in said second end section between the open end thereof and said second piston member 59. A jack means such as a scissor jack comprising threaded screw rod 62 and arms such as 63 is disposed within said second end section 52 between the closed end thereof and the other side of said second piston member 59 for moving said piston member back and forth within said second end section and thereby vary the distance between said ends of said first and second grains of propellant material. Said jack means can be operated by hand by means of crank 64 attached to the extended end of rod 62 which extends through a packing gland in the wall of chamber 52. An annular gas conduit 66 is attached to said open ends of said end sections 51 and 52 as by means of the welds shown and surrounds said perforated mid-section 53. Pressure gage 67 is provided for measuring the pressure in said combustion chamber and gas conduit 66.

In the operation of the apparatus of FIGURE 3, igniter material 68 is ignited by means of an electric current conducted by wires 69 and said propellants 57 and 61 are ignited. While only one igniter charge has been shown, a separate igniter charge for each grain of propellant material can be employed if desired. Any suitable type of igniter material can be used. During operation, spring 58 bears against piston member 56 and biases the burning end of propellant grain 57 against said grate 54 continuously until said propellant is consumed. Said propellant 61 is also burning, and during said operation the operator can observe the pressure on pressure gage 67 and can vary the distance between the burning surfaces of said propellants 57 and 61 by means of crank 64. Depending upon the direction screw rod 62 is turned, said propellant 61 will be moved toward or away from said propellant 57. If desired, said screw rod 62 can be operated automatically by employing the control system of FIGURE 1. In such event crank 64 would be removed and the end of rod 62 connected to the shaft of motor 43 as illustrated in FIGURE 1.

Said propellant materials are substantially non-heat conducting materials. The flame front on the burning end of each of said propellants will be a heat radiating surface. Thus, each grain of propellant furnishes a heat radiating surface for the other grain of propellant.

It is believed obvious that the apparatus of FIGURE 3 can be operated automatically in the same manner as the apparatus of FIGURE 1 by connecting the shaft of motor 43 to the end of screw rod 62.

In FIGURE 5 there is illustrated another gas generator in accordance with the invention. Said gas generator is designated generally by the reference numeral 70 and comprises a first end section 71 and a second end section 72. One end of each of said end sections is normally closed as shown and the other end of each of said sections is normally open as shown. Said sections are spaced apart at said open ends and are connected by a perforated mid-section 75 which forms a gas outlet for said end sections. A gas outlet conduit 73 surrounds said open ends of said sections and is attached thereto by means of the welds shown. A first perforated grate 74 is slidably disposed in said mid-section 75 and across said first end section 71 adjacent the open end thereof. Said grate 74, like all of the grates illustrated herein can consist of a grate or other suitable arrangement of metal rods, bars, or wires, shown to be integral in the drawing but which are not necessarily integral. A first piston member 76 is slidably disposed in said first end section on the other side of said first grate 74 away from said open end. A first grain of propellant material 77 restricted with a slow burning restricting material and adapted for burning on one end only as previously described is disposed in said first end section between said first grate 74 and said first piston member 76. A spring 78, or any other suitable means, is disposed within said first end section 71 between the closed end thereof and said first piston member 76 for moving said piston member so as to bias said grain of propellant material 77 against said grate 74.

A second perforated grate 79 is slidably disposed in said mid-section 75 and across said second end section 72 adjacent the open end thereof. A second piston member 81 is slidably disposed in said second end section on the other side of said second grate 79 away from said open end. A second grain of propellant material 82 is slidably disposed in said second end section between said second grate 79 and said second piston member 81. Support legs can be provided on said propellants 77 and 79 as in FIGURE 6 if desired. Second spring means 83 is provided for biasing said propellant 82 against grate 79 in the same manner as described for said first grain of propellant material. Jack means comprising threaded rod 84 and bar members 85 with one of said bar members being attached to said first grate 74 and the other bar member 85 attached to said second grate 79, is disposed adjacent said grates, but out of the flame zone between said grates, for moving said grates toward each other and away from each other when said screw rod 84 is rotated by means of crank 86. Said bar members 85 are each attached to an internally threaded collar which travels on said rod 84. If desired, said screw rod 84 can be operated automatically by employing the control system of FIGURE 1. In such event the crank at the end of screw rod 84 would be removed and said end of said rod would be connected to the shaft of motor 43 as illustrated in FIGURE 1. Pressure gage 87 is provided for measuring the pressure in said combustion chamber.

It is believed the operation of the apparatus of FIGURE 5 will be evident in view of the description thereof and the description of the operation of the apparatus of FIGURE 3. Although no igniter means has been shown in FIGURE 5, it is to be understood that any suitable type of igniter means, such as that employed in FIGURE 3 or FIGURE 6, can be employed.

In FIGURES 6 and 7 there is illustrated a rocket motor embodying the principles of the invention. Said rocket motor comprises a cylindrical combustion chamber 90 having an axially disposed exhaust nozzle 91 at one end thereof. A perforated grate 92 is fixed across said combustion chamber adjacent said nozzle. A disc 93 of non-heat conducting material is movably disposed within said chamber between said grate and said nozzle with a heat radiating surfaces 94 thereof facing toward said grate. A piston member 96 is slidably disposed within said chamber on the other side of said grate from said nozzle. A grain of rocket propellant material 97, adapted to burn on one end only, is slidably disposed within said chamber between said grate 92 and said piston member 96. Support legs 95 can be employed on said propellant to reduce friction if desired. A sheet of igniter material 98 is disposed at the forward end of said grain of propellant material adjacent said grate 92. Said igniter material can be ignited by means of electrical lead wires 99 which extend through the wall of said combustion chamber and are embedded in said igniter material. Any suitable form of igniter material known in the art can be used for igniting said propellant material.

As in FIGURES 3 and 5, means are provided for moving said piston 96 so as to bias said grain of propellant material against said grate 92. Any suitable biasing means can be used. As illustrated in the drawing, a high pressure gas from tank 101 is passed into space 102 behind said piston 96. As is evident, the pressure in space 102 must be greater than the pressure in the combustion chamber which is acting on the after end of said grain of propellant material. The amount of gas passed into space 102 is controlled by valve 103 which is actuated through pressure sensing conduit 104 communicating with said space 102. Said space 102 is formed by a member 107 which is fixed across said combustion chamber forwardly of said piston member 96. Said member 107 together with the forward end 108 of the combustion chamber forms space 109 in which there is located various other elements of the control apparatus.

Said control apparatus comprises a pressure transducer 111 which comprises a spring loaded piston 112. The space below said piston 112 is operatively connected to conduit 106 which extends through the wall of said combustion chamber and communicates with the after end of said combustion chamber. A lever arm 113, pivotally supported at 114, is pivotally connected at one end thereof to said piston 112 through an opening in the wall of transducer 111 as shown. The other end of said lever arm is provided with gear teeth and extends into gear box 116 wherein said gear teeth engage the teeth of gear wheel 117 which is mounted on the same shaft as gear wheel 118 (see FIGURE 7). The teeth on gear wheel 118 engage the teeth on gear wheel 119 which is mounted on the same shaft as gear wheel 121. The teeth on said gear wheel 121 engage the teeth on gear wheel 122 and rotate shaft 123 which is connected to a cable extending through cable conduit 124 and connecting at its other end to screw bar 126 of a jack means similar to that described in connection with FIGURES 3 and 5, which is mounted in said combustion chamber adjacent said exhaust nozzle 91. Said cable conduit 124 extends through a conduit provided in the wall of combustion chamber 90 and is connected to said screw rod 126 by a suitable rotatable pressure connection. One pair of arms 127 of said jack means is connected to the back side of said disc of non-heat conducting material 93. Said jack means serves to move said disc 93 toward and away from the burning end of propellant 97 in a manner similar to that previously described in connection with FIGURES 3 and 5.

In the operation of the rocket motor of FIGURE 6, the propellant material is ignited by means of igniter 98 and the pressure within the combustion chamber is transmitted via conduit 106 to pressure transducer 111 wherein it acts upon piston 112 and, depending upon the previous setting of the spring in said pressure transducer, lever arm 113 is moved to cause rotation of the gears in said gear box which in turn causes screw rod 126 of the jack means to be rotated and disc 93 will be moved toward or away from the burning end of propellant 97 depending upon whether or not the pressure within the combustion chamber is lower or higher than the control point which has been set by the spring tension in pressure transducer 111. The operation of the rocket motor can be programed for variable thrust by employing a cam arrangement or other means to vary the tension of said spring.

Any suitable means can be provided in space 102 for moving piston 96. For example, a charge of solid combustion gas producing material, such as another propellant material, can be provided in said space 102. Such means for moving pistons of the type of piston member 96 are well known to those skilled in the art as shown in Patent 2,703,960.

While said rocket motor has been illustrated as having an integral case it will be understood that said case can be fabricated in sections and joined together in any suitable manner to facilitate fabrication and loading thereof. Many methods are available to those skilled in the art for doing this. For example, see said Patent 2,703,960.

Obviously, any suitable propellant material can be employed in the rocket motor of the invention. Examples of suitable propellants are the rubber base propellants. Such solid propellants comprise a rubbery binder or fuel component as the continuous phase having a solid oxidant component, together with or without a suitable burning rate catalyst, dispersed in said binder component. A presently preferred class of solid propellants comprises a solid oxidant, such as ammonium nitrate or ammonium perchlorate, dispersed in a rubbery material, such as a copolymer of a conjugated diene and a vinylpyridine or other substituted heterocyclic nitrogen base compounds. These propellants are produced by mixing the oxidant and copolymer together with suitable curing or quaternizing agents, and with or without an appropriate burning rate catalyst. The resulting mixture is then cast, compression molded, or extruded, and then cured to form the solid propellant grain. Solid rocket fuel compositions of this type and a process for their production are disclosed and claimed in copending application Serial No. 284,447, filed April 25, 1952, by W. B. Reynolds et al.

Castable propellant compositions can also be employed in the rocket motor of the invention. An example of a suitable binder composition in this type propellant is a polyurethane comprised of a polypropylene glycol (molecular weight about 2000), a triol or quadraol such as caster oil or Quadrol (N,N,N',N'-tetrakis-(2-hydroxypropyl)-ethylenediamine), and tolylene diisocyanate.

The restrictor material applied to the propellant grains of the invention can be any of the slow burning materials used for this purpose in the rocket art, such as cellulose acetate, ethyl cellulose, butadiene-methylvinyl-pyridine copolymer, GR–S, and the like. Said restrictor material can be self-bonded, solvent bonded, or adhesively bonded to the propellant grains with any suitable adhesive such as Thiokol Bonding Agent sold by the Thiokol Corporation, 7711 Rubber Cement sold by Van Cleef Bros. Inc., and Van Cleef's Rubber Bonding Cement. Any suitable adhesive, including those just named, can be used to bond the restricted grains to the piston members described above.

Any suitable non-heat conducting material can be employed to provide the heat radiating surface employed in the practice of the invention. All materials will conduct heat to some extent; however, some materials are such poor heat conductors that for all practical purposes they are considered nonconductors and are used as such for insulating purposes. Thus, herein and in the claims, unless otherwise specified, the term "substantially non-heat conducting material" refers to a material which is such a poor conductor of heat under the conditions of use that it will serve its intended purpose. Good heat conductors such as the metals copper and aluminum have heat conductivities in the order of 0.913 and 0.480 respectively. Poor heat conductors, such as contemplated for use in the practice of the invention have heat conductivities in the order of 0.006 or lower. Said units of heat conductivity are the heat in calories transmitted per second through a plate one centimeter thick across an area of one square centimeter when the temperature differential is 1° C.

Examples of suitable non-heat conducting materials which can be used in the practice of the invention include such materials as mullite, zirconium oxide, barium titanate, and other ceramic materials of various kinds, and various other refractory materials. However, laminates of phenol-formaldehyde resin with refractory fillers surfaced with carbon black-filled phenol-formaldehyde are preferred. Especially useful refractory fillers are in the form of rovings made up of glass and asbestos fibers. Suitable rovings can be prepared from glass fibers woven into a mesh or felted into a prepreg felt containing 30–40% or more by weight of a phenol-formaldehyde resin. Asbestos fibers can be substituted for the fiber glass in preparing the laminates. It is preferable to utilize the glass fibers in the outer layer.

The desired amount, 30–40 weight percent, of phenol-formaldehyde resin is added to the filler. In the outer layer about 2–5 weight percent of carbon black is mixed into the resin before addition of the resin to the felted fibers or roving. Alternately, the prepreg may be made with low resin content and a final coating of resin may be applied to the outer surface of the felt before pressing. The carton black content of this final resin coating should be about 10 weight percent. The filled resin is then cured at temperatures in the range 260–500° F. under pressures of 200–500 p.s.i.

The laminate can be made up in 2 or 3 layers and can be bonded together with an epoxy-type resin activated by 10 percent by weight of tridimethylaminomethyl phenol. This material cures at room temperature in about 4 hours.

The following examples will serve to further illustrate the invention. Two propellants A and B having the compositions shown in Table I below were prepared.

TABLE I

| Ingredient | Propellant A, Weight Percent | Propellant B, Weight Percent |
|---|---|---|
| Bd/MVP (90/10) | 9.68 | 9.85 |
| Philblack A | 2.18 | 2.20 |
| Flexamine | 0.29 | 0.30 |
| Magnesium Oxide | 0.47 | 0.48 |
| ZP-211 | 1.93 | 1.95 |
| Ammonium Nitrate | 79.81 | 81.42 |
| Ammonium Dichromate | 3.76 | 1.90 |
| Milori Blue | 1.88 | 1.90 |
| Total | 100.00 | 100.00 |
| Properties: | | |
| Density, #/cu. in | 0.056 | 0.0554 |
| $r_{(600)}$, in./sec. | 0.250 | 0.160 |
| $n$, from $R=CP_c{}^n$ | 0.66 | 0.50 |

Flexamine—Brown powder consisting of 65% of a complex diarylamine ketone reaction product and 35% of N,N'-diphenyl-p-phenylenediamine.
ZP-211—A topped fraction of commercial di-[butoxyethoxyethyl] formal.

*Example I*

When propellant A is burned in an apparatus equivalent to that illustrated in FIGURE 1 and the flame front resulting from the burning of said propellant in said apparatus is confined between the burning surface of said propellant and a heat radiating surface provided by the surface of a substantially non-heat conducting material comprising a laminate of phenol-formaldehyde resin prepared as described above, it is found that the burning rate of said propellant varies with the distance between said burning surface of said propellant and said heat radiating surface as set forth in the following Table II.

TABLE II

Distance between
surfaces, in.:                                           $r_{600}$, in./sec.
0.1 ----------------------------------------- 0.33
0.2 ----------------------------------------- 0.30
0.5 ----------------------------------------- 0.28
1.0 ----------------------------------------- 0.26
2.0 ----------------------------------------- 0.24

*Example II*

When two grains of propellant B are burned in an apparatus equivalent to that illustrated in FIGURES 3 or 5, the burning surface of each of said propellants provides the heat radiating surface for the other propellant. Thus, the flame front of each given propellant is confined between the burning surface of said given propellant and the burning surface of the propellant charge opposed thereto. Under these conditions it is found that the burning rate of said propellants varies with the distance between the burning surfaces of said propellants as set forth in the following Table III:

TABLE III

| Distance between surfaces, in.: | $r_{600}$, in./sec. |
|---|---|
| 0.1 | 0.25 |
| 0.2 | 0.24 |
| 0.4 | 0.23 |
| 0.7 | 0.22 |
| 1.2 | 0.21 |
| 1.7 | 0.20 |
| 2.5 | 0.19 |
| 3.8 | 0.18 |
| 5.7 | 0.17 |
| 10.0+ | 0.16 |

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A method for controlling the burning rate of a solid propellant which method comprises increasing and decreasing the distance between the burning surface of said propellant and an adjacent heat radiating surface.

2. A method for controlling the burning rate of a solid propellant material, which method comprises: igniting said propellant; and increasing and decreasing the distance between the burning surface of said propellant and an adjacent spaced apart substantially non-heat conducting heat radiating surface.

3. A method for controlling the burning rate of a grain of propellant material, which method comprises: igniting said propellant; confining the resulting flame zone between the burning surface of said propellant and an adjacent spaced apart substantially non-heat conducting, heat radiating surface; and increasing and decreasing the distance between said burning surface and said radiating surface.

4. The method of claim 3 wherein said radiating surface is the burning surface of a second grain of burning propellant material.

5. In the operation of a gas generating device wherein a grain of propellant material is being burned with the evolution of combustion gases which are exhausted from said device, the method of controlling the burning rate of said propellant, which method comprises: confining the resulting flame zone between the burning surface of said propellant and an adjacent spaced apart substantially non-heat conducting, heat radiating surface; and increasing and decreasing the distance between said burning surface and said radiating surface.

6. The method of claim 5 wherein said radiating surface is the burning surface of a second grain of burning propellant material.

7. The method of claim 5 wherein said radiating surface is the surface of a substantially non-heat conducting, non-combustible material.

8. In the operation of a gas generating device wherein a grain of propellant material is being burned with the evolution of combustion gases which are exhausted from the combustion chamber of said device, the method of controlling the burning rate of said propellant, which method comprises: confining the flame zone resulting from the burning of said propellant between the burning surface of said propellant and an adjacent spaced apart substantially non-heat conducting, heat radiating surface; and varying the distance between said burning surface and said radiating surface in accordance with the pressure in said combustion chamber.

9. In the operation of a gas generating device wherein a grain of propellant material is being burned with the evolution of combustion gases which are exhausted from the combustion chamber of said device, the method of controlling the burning rate of said propellant, which method comprises: confining the flame zone resulting from the burning of said propellant between the burning surface of said propellant and an adjacent spaced apart substantially non-heat conducting, heat radiating surface; measuring the pressure in said combustion chamber; and varying the distance between said burning surface and said radiating surface in accordance with said pressure.

10. A gas generator device comprising: a combustion chamber having an exhaust gas outlet; a grain of solid propellant material adapted for burning on one end only disposed within said combustion chamber; a member of substantially non-heat conducting material disposed within said combustion chamber adjacent, and with a heat radiating surface thereof facing toward said end of said propellant; and means for increasing and decreasing the distance between said end of said propellant and said radiating surface.

11. A gas generator device comprising: a combustion chamber having an axially disposed exhaust gas outlet at one end; a grain of solid propellant material adapted for burning on one end only slidably disposed within said combustion chamber; a member of substantially non-heat conducting material fixed within said combustion chamber adjacent said gas outlet with a heat radiating surface thereof facing toward said end of said propellant; and means for moving said grain of propellant material toward and away from said radiating surface and thereby varying the distance between said end of said propellant and said radiating surface.

12. A gas generator according to claim 11 wherein said means for moving said grain of propellant material comprises: a piston slidably mounted in said combustion chamber and bonded to the other end of said propellant materials; and jack means attached to said piston on the opposite side thereof from said propellant material for moving said piston.

13. A gas generator according to claim 11 wherein said means for moving said grain of propellant material comprises: a piston slidably mounted in said combustion chamber and bonded to the other end of said propellant material; jack means attached to said piston on the opposite side thereof from said propellant material for moving said piston; and means for actuating said jack means responsive to the pressure in said combustion chamber.

14. A gas generator device comprising: a combustion chamber having an axially disposed exhaust gas outlet at one end; a grain of solid propellant material adapted for burning on one end only slidably disposed within said combustion chamber; a member of substantially non-heat conducting material movably disposed within said combustion chamber adjacent said gas outlet with a heat radiating surface thereof facing toward said end of said propellant; a grate fixed across said combustion chamber between said gas outlet and said end of said propellant; means for biasing said end of said grain of propellant material against said grate; and means for moving said radiating surface toward and away from said end of said propellant material and thereby varying the distance between said end of said propellant material and said radiating surface.

15. A gas generator device according to claim 14 wherein said means for moving said radiating surface comprises jack means mounted within said combustion chamber and attached to said member having said radiating surface on the opposite side of said member from said radiating surface.

16. A gas generator device according to claim 14 wherein said means for moving said heat radiating surface comprises: jack means mounted within said combustion chamber and attached to said member having said radiating surface on the opposite side of said member from said radiating surface; and means for actuating said jack means responsive to the pressure in said combustion chamber.

17. A gas generator device comprising: a combustion chamber having a first end section and a second end section, one end of each of said end sections being normally closed, and the other end of each of said sections being normally open; a perforated mid-section disposed between and connecting said open ends of said end sections, said perforated mid-sections forming a gas outlet for said combustion chamber; a gas conduit means attached to said open ends of said end sections and surrounding said perforated mid-section; a perforated grate fixed across said first end section at its open end and adjacent said mid-section gas outlet; a first piston member slidably disposed in said first end section on the other side of said grate from said gas outlet; a first grain of propellant material adapted for burning on one end only disposed in said first end section between said grate and said piston member; means disposed within said first end section between said closed end thereof and said piston member for moving said piston member to bias said first grain of propellant material against said grate continuously until said propellant is consumed; a second piston member slidably disposed in said second end section; a second grain of propellant material adapted for burning on one end only, bonded at its other end to one side of said second piston member, and disposed in said second end section between said open end thereof and said second piston member; jack means disposed within second end section between said closed end thereof and the other side of said second piston member for moving said piston member back and forth within said second end section and thereby varying the distance between said ends of said first and second grains of propellant material; and means for actuating said jack means.

18. A gas generator device comprising: a combustion chamber having a first end section and a second end section, one end of each of said sections being normally closed, the other end of each of said sections being normally open, and said sections being spaced apart at said open ends; a gas outlet conduit means attached to and surrounding said open ends of said sections thereby connecting said sections; a first perforated grate slidably disposed across said first end section adjacent said open end thereof; a first piston member slidably disposed in said first end section on the other side of said first grate from said open end; a first grain of propellant material adapted for burning on one end only disposed in said first end section between said first grate and said first piston member; means disposed within said first end section between said closed end thereof and said first piston member for moving said first piston member to bias said first grain of propellant material against said grate continuously until said propellant is consumed; a second perforated grate slidably disposed across said second end section adjacent said open end thereof; a second piston member slidably disposed in said second end section on the other side of said second grate from said open end; a second grain of propellant material adapted for burning on one end only disposed in said second end section between said second grate and said second piston member; means disposed within said second end section between said closed end thereof and said second piston member for moving said second piston member to bias said second grain of propellant material against said second grate continuously until said propellant is consumed; jack means disposed adjacent and operatively connected to said first grate and said second grate for moving said grates toward each other and away from each other and thereby vary the distance between said ends of said first and second grains of propellant material; and means for actuating said jack means.

19. A rocket motor comprising: a cylindrical combustion chamber having an axially disposed exhaust nozzle at one end; a perforated grate fixed across said chamber adjacent said nozzle; a disc of non-heat conducting material movably disposed within said chamber between said grate and said nozzle with a heat radiating surface thereof facing toward said grate; a piston member slidably disposed within said chamber on the other side of said grate from said nozzle; a grain of rocket propellant material adapted to burn on one end only disposed within said chamber between said grate and said piston member; means for moving said piston so as to bias said end of said propellant grain against said grate until said propellant material is consumed; and means for moving said disc toward and away from said grate responsive to the pressure within said chamber and thereby varying the distance between said end of said propellant material and said radiating surface.

References Cited in the file of this patent
UNITED STATES PATENTS

| | | |
|---|---|---|
| 1,074,312 | Collins | Sept. 30, 1913 |
| 2,266,551 | Harvey | Dec. 16, 1941 |
| 2,799,136 | De Boisblanc | July 16, 1957 |
| 2,816,419 | Mueller | Dec. 17, 1957 |
| 2,816,721 | Taylor | Dec. 17, 1957 |
| 2,931,170 | Mittelstaedt | Apr. 5, 1960 |